(12) United States Patent
Engel

(10) Patent No.: US 6,223,688 B1
(45) Date of Patent: *May 1, 2001

(54) LINER AND LINER SYSTEM FOR LITTER BOX AND LITTER BOX COVER

(76) Inventor: Eric M. Engel, 481 W. 22nd St. Apt. 1, New York, NY (US) 10011

( * ) Notice: Subject to any disclaimer, the term of this patent is extended or adjusted under 35 U.S.C. 154(b) by 0 days.

This patent is subject to a terminal disclaimer.

(21) Appl. No.: 09/549,740

(22) Filed: Apr. 14, 2000

Related U.S. Application Data

(63) Continuation-in-part of application No. 09/383,672, filed on Aug. 26, 1999, now Pat. No. 6,055,935.

(51) Int. Cl.[7] ................................................ A01K 29/00
(52) U.S. Cl. ........................................ 119/170; 119/165
(58) Field of Search .................................. 119/165, 167, 119/169, 170; 220/495.01, 495.05, 495.06; 493/93

(56) References Cited

U.S. PATENT DOCUMENTS

| | | |
|---|---|---|
| 3,684,155 | 8/1972 | Smith . |
| 3,771,493 | 11/1973 | Chandor . |
| 4,299,190 | 11/1981 | Rhodes . |
| 4,308,825 | 1/1982 | Stepanian . |
| 4,469,046 | 9/1984 | Yananton . |
| 4,522,150 | 6/1985 | Gershman . |
| 4,640,225 | 2/1987 | Yananton . |
| 4,771,731 | 9/1988 | Derx et al. . |
| 4,774,907 | 10/1988 | Yananton . |
| 4,800,842 | 1/1989 | Jones, Jr. . |
| 4,840,140 | 6/1989 | Yananton et al. . |
| 4,858,561 | 8/1989 | Springer . |
| 4,869,204 | 9/1989 | Yananton . |
| 4,884,526 | 12/1989 | Giannakopoulos . |
| 5,027,748 | 7/1991 | Wolak . |
| 5,129,364 | 7/1992 | Pirkle . |
| 5,134,974 | 8/1992 | Houser . |
| 5,178,099 | 1/1993 | Lapps et al. . |
| 5,178,100 | 1/1993 | Monk . |
| 5,289,800 | 3/1994 | Walton . |
| 5,392,733 | 2/1995 | Tominaga . |
| 5,396,864 | 3/1995 | Mannschreck . |
| 5,564,365 | 10/1996 | Kacic . |
| 5,572,950 | 11/1996 | O'Rourke et al. . |
| 5,623,892 | 4/1997 | O'Rourke et al. . |
| 5,676,090 | 10/1997 | Cannady, Jr. . |
| 5,918,567 | 7/1999 | Roth . |

Primary Examiner—Charles T. Jordon
Assistant Examiner—Elizabeth Shaw
(74) Attorney, Agent, or Firm—Charles E. Bruzga

(57) ABSTRACT

In an exemplary form, the invention provides a liner for a litter box cover designed to rest on a litter box bottom. The liner comprises a sidewall for lining a substantial portion of a sidewall of the cover otherwise exposed to pet waste during normal operation. The sidewall comprises a fluid impermeable layer and an aperture for access by a pet. The liner further comprises at least one fastener for being held in position relative to the cover. The liner may include a top comprising a fluid impermeable layer attached to the liner sidewall around a substantial portion of a lateral periphery of the top. In addition to the fluid impermeable layer, the liner sidewall preferably includes a sorbent layer for absorbing pet urine and preferably a claw-resistant layer for protecting the sorbent layer. Using the foregoing liner for a litter box cover together with a liner for a litter box bottom achieves significant reduction in bacteria or odor buildup in a litter box. Additionally, use of such liners for the cover and bottom typically eliminates the need for routine cleaning of the litter box itself. Thus, while the liners will need to be periodically changed, the litter box typically remains clean and odor-free for months.

42 Claims, 5 Drawing Sheets

US 6,223,688 B1

LINER AND LINER SYSTEM FOR LITTER BOX AND LITTER BOX COVER

CROSS-REFERENCE TO RELATED APPLICATION

This application is a continuation-in-part of application Ser. No. 09/383,672, filed on Aug. 26, 1999 now U.S. Pat. No. 6,055,935 for "Liner and Liner System for Litter box and Litter box Cover," by Eric M. Engel.

FIELD OF INVENTION

The present invention relates to litter boxes for collecting pet feces and urine and to liners for such litter boxes.

BACKROUND OF INVENTION

Litter boxes formed of a cover and a bottom are commonly used to collect feces and urine of pets or other animals such as cats. For reducing bacteria or odor buildup, various liners have been provided for covering a bottom of the litter box. U.S. Pat. No. 5,850,798, issued to the present inventor and describing one such liner for a litter box bottom, achieves reduction in bacteria or odor buildup. However, even further improvements in reducing bacteria or odor buildup would be desirable.

SUMMARY OF THE INVENTION

In a preferred form, the invention provides a liner for a litter box cover designed to rest on a litter box bottom. The liner comprises a sidewall for lining a substantial portion of a sidewall of the cover otherwise exposed to pet urine during normal operation. The sidewall comprises a fluid impermeable layer and an aperture for access by a pet. The liner further comprises at least one fastener for being held in position relative to the cover. The liner may include a top attached to the liner sidewall around a substantial portion of a lateral periphery of the top. In addition to the fluid impermeable layer, the liner sidewall preferably includes a sorbent layer for absorbing pet urine and preferably a claw-resistant layer for protecting the sorbent layer. The top of the liner comprises a fluid impermeable layer.

Using the foregoing liner for a litter box cover together with a liner for a litter box bottom achieves significant reduction in bacteria or odor buildup in a litter box. Additionally, use of such liners for the cover and bottom typically eliminates the need for routine cleaning of the litter box itself. Thus, while the liners will need to be periodically changed, the litter box typically remains clean and odor-free for months.

BRIEF DESCRIPTION OF DRAWINGS

In the drawings, in which like reference numerals refer to like parts.

DETAILED DESCRIPTION OF THE INVENTION

Figure 1:
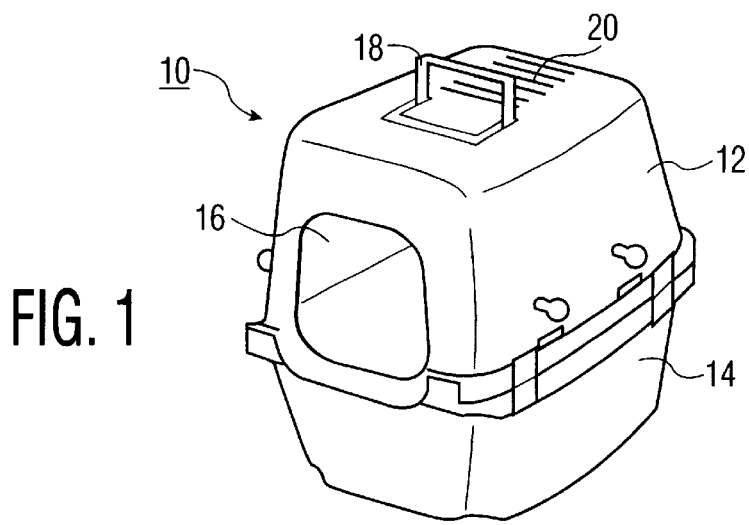
FIG. 1 is a perspective view of a litter box that may incorporate features of the invention.
Figure 2:
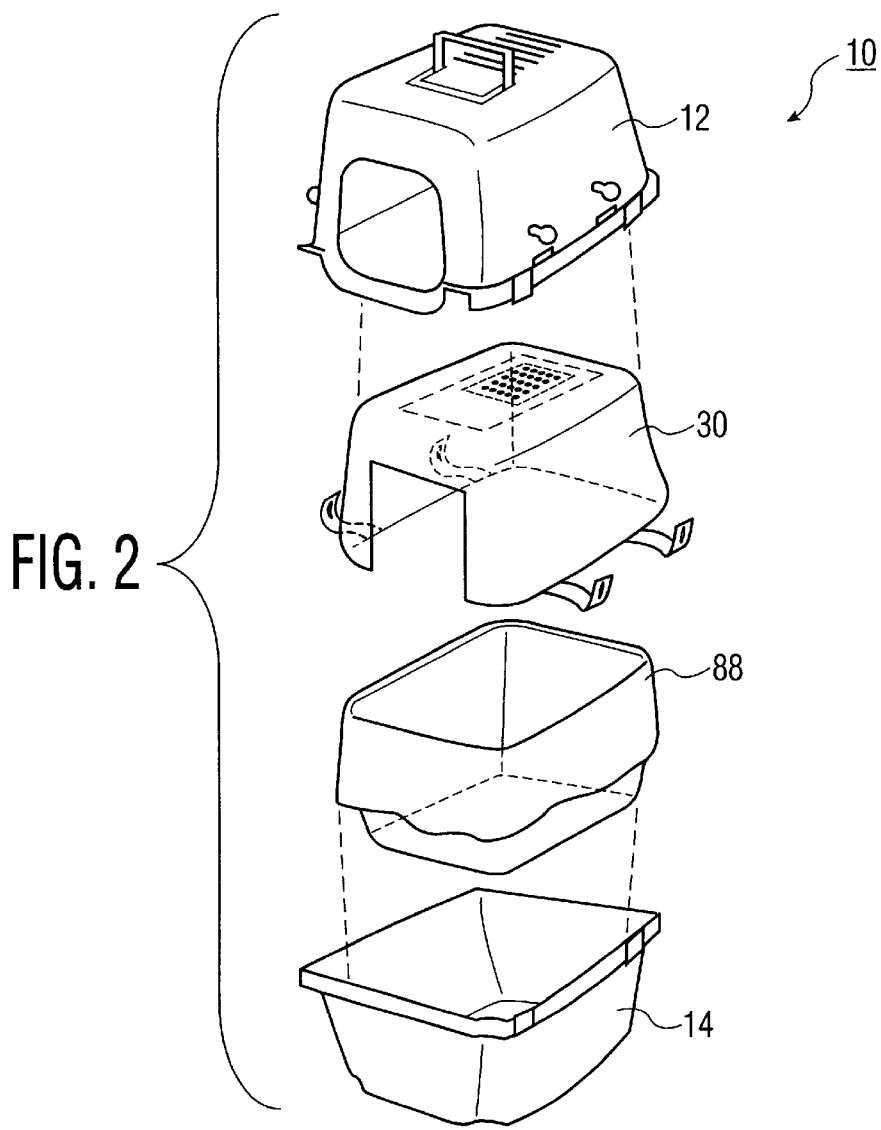
FIG. 2 is a simplified, exploded view of the litter box of FIG. 1 also showing respective upper and lower liners for the cover and bottom of the litter box.

FIG. 1 shows a litter box 10, for a pet or other animal such as a cat. The litter box has a cover 12, a bottom 14, a doorway 16, a handle 18 and a vent 20. The vent may include a charcoal or other filter. The cover and bottom may be made of molded plastic unit-body construction. FIG. 2 is an exploded view of box 10, showing a liner 30 associated with cover 12 and a liner 88 associated with bottom 14. An exemplary liner 30 is generally designated by numeral 30 in FIG. 3, and includes sorbent material as will be described below.

Figure 3:
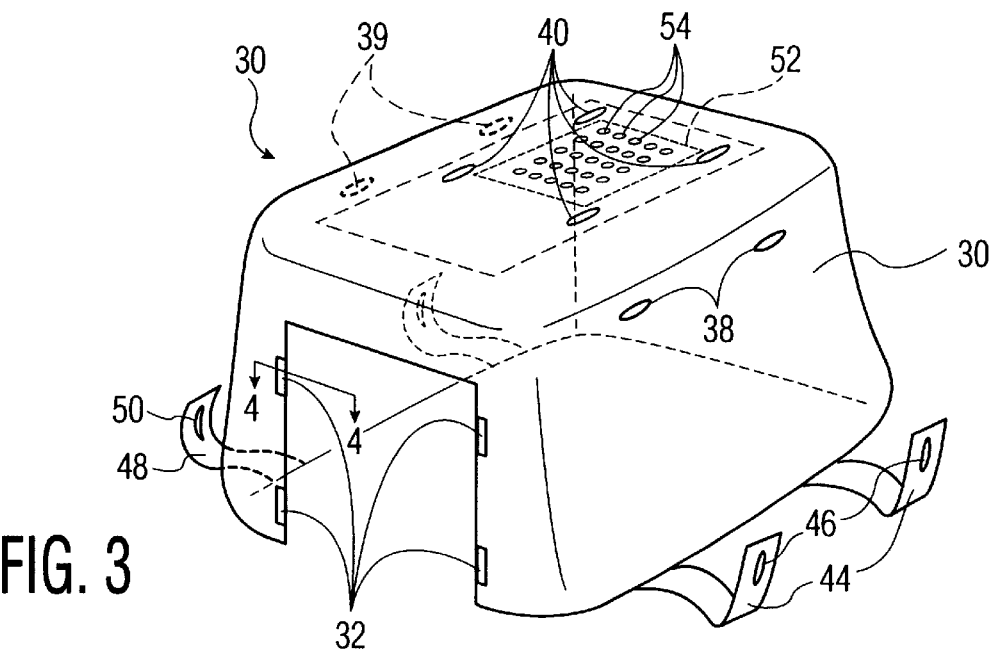
FIG. 3 is a perspective view of a liner for a litter box cover that may be used with the litter box of FIG. 1, with the litter box absent for ease of viewing.
Figure 4:
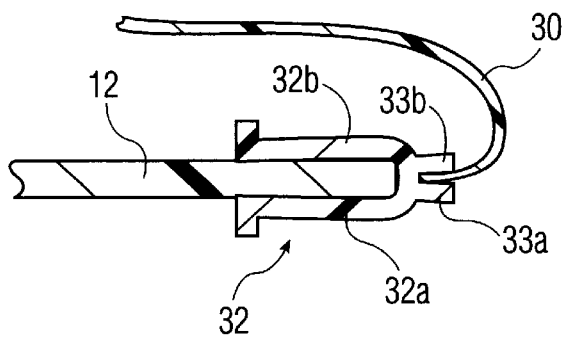
FIG. 4 is a detail upper view partially in cross section of a clip 32 of FIG. 3 attached to a litter box cover as taken at lines 4—4 in FIG. 3.

As shown in FIG. 3, clips 32 may be provided for holding the liner to a litter box cover in the vicinity of doorway 16. FIG. 4 shows a detail view of a clip 32, including sides 32a and 32b tensioned to press towards each other and against a portion of litter box cover 12 near the doorway. Clip 32 itself may include members 33a and 33b tensioned to press towards each other and against a portion of liner 30 for attaching the clip to the liner. Many alternatives for clips 32 will be apparent to those of ordinary skill in the art, such as snaps, tracks, adhesives, or pegs.

FIG. 3 shows further details of liner 30, which may be symmetrical and may incorporate buttonholes, such as shown at 38 on its right side, or corresponding buttonholes 39 (shown in dashed lines) on its left side, for being secured to the cover. If the liner includes a top as shown, it preferably incorporates buttonholes 40 respectively located on the top of the liner near the corners of a ventilated region 52. Straps 44 with respective buttonholes 46 may be used to secure the bottom of the right side of the liner to a cover, and straps such as 48 with respective buttonholes such as 50 may be used to secure the other side of the liner to a cover. Fewer or more buttonholes (and corresponding knobs on the cover) may be used if desired. For instance, each pair of buttonholes 38, 39 and 46 could be replaced with a single buttonhole. The buttonholes may be slightly elasticized or gathered to facilitate their engagement with cooperating knobs or other means (not shown) on the cover.

If the liner includes a top, ventilated region 52 cooperates with vent 20 in cover 12 (FIG. 1) to allow ventilation through the combined cover and liner. Region 52 may take the form of a series of perforations 54 through the liner, for allowing ventilation through the vent in the cover.

Figure 5:
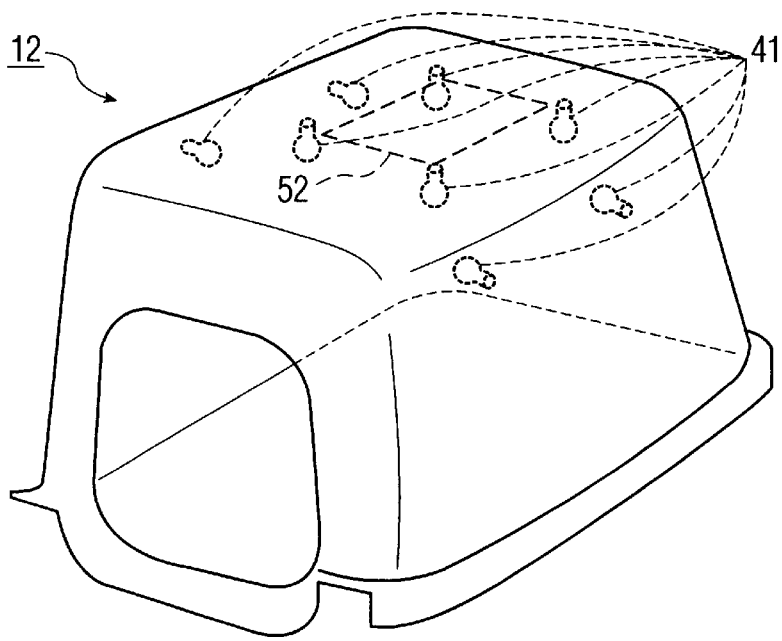
FIG. 5 is a simplified perspective view of a litter box cover showing interior-facing knobs that may be used for attaching a liner.

FIG. 5 shows a simplified perspective view of cover 12 (FIG. 1). It shows interior-directed knobs 41 that cooperate with buttonholes 38, 39 and 40 of the liner (FIG. 3), for attaching the liner to the cover. In particular, the liner may be held in place pressing it against the cover in the vicinity of the buttonholes so that the knobs pass through the buttonholes.

Figure 6:
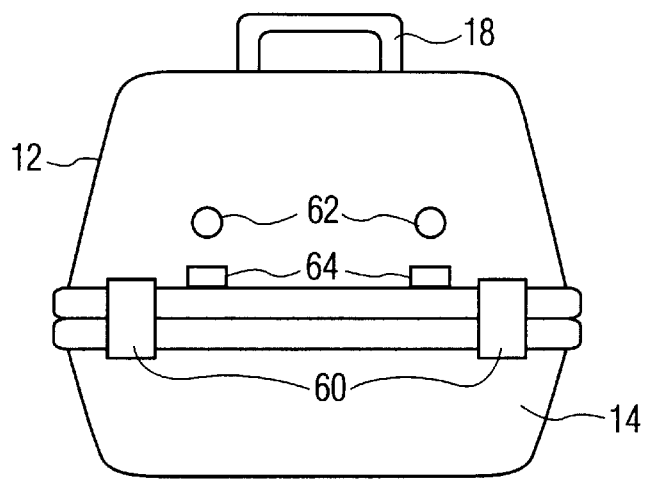
FIG. 6 is a side plan view of the litter box of FIG. 1.

FIG. 6 shows a side view of litter box 30 without the liner for the cover. Conventional clips 60 hinged to cover 12 secure the cover to bottom 14. Knobs 62, which may each take the form of a flattened sphere, cooperate with straps of a liner for the cover shown as 44 or 48 in FIG. 3. Notches 64 in cover 12 allow straps 44 or 48 (FIG. 3) to pass from inside to outside cover 12 so as to reach and interact with knobs 62. FIG. 6 shows how strap 44 may pass through notch 64 in cover 12 so that knob 62 may be inserted through the buttonhole in the strap.

Figure 7:
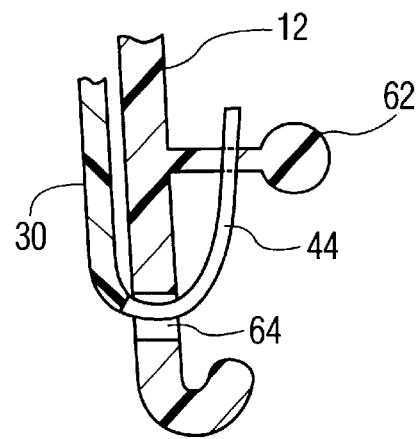
FIG. 7 is a detail view in cross section of the liner shown in FIG. 3 and a cooperating litter box cover.
Figure 8:
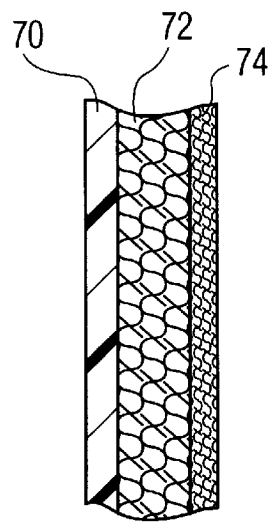
FIG. 8 is an enlarged, fragmentary cross sectional view of a portion of the liner shown in FIG. 3.

FIG. 8 shows a preferred construction of liner 30 for the litter box cover. Liner 30 may have an outside layer 70 that is impermeable to fluid, an inner layer 72 containing a sorbent material, and an inside layer 74 that is claw resistant. Sorbent layer 72 preferably absorbs urine and distributes it to facilitate rapid evaporation of its moisture content. Claw-resistant layer 74 may be conventional per se, and is preferably affixed to layer 70 in such a manner as to hold the sorbent layer in place. Thus, it is desirable that the sorbent material be held in place so as to avoid substantially sagging away from layer 70, or shifting into a clump and reducing the surface of the sorbent material exposed to pet urine. Many ways of affixing layer 74 to layer 72 will be obvious to a person of ordinary skill in the art. Layer 74 may also be affixed to sorbent layer 72. Liner 30 may include other layers, if desired, such as a durable non-woven tissue substance between layers 72 and 74. FIGS. 4 and 7 show cross sections of liner 30 that are simplified since they do not show the actual multi-layer structure of FIG. 8.

Figure 9:
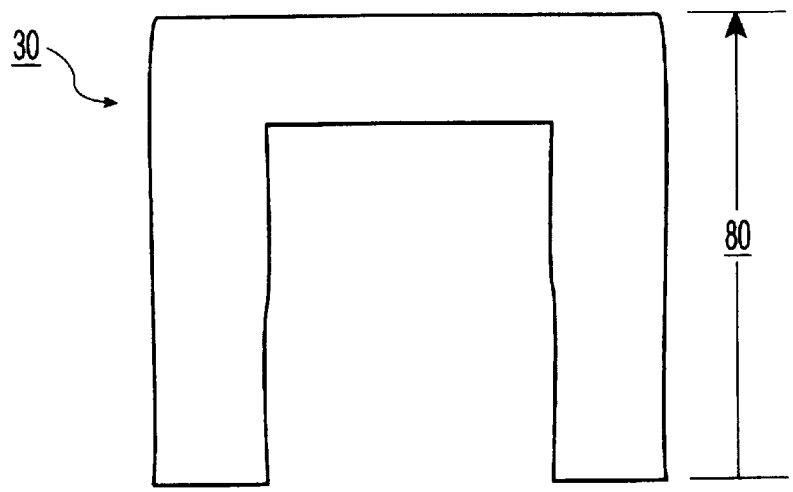
FIG. 9 is a front plan view of the liner shown in FIG. 3.

FIG. 9 is a front plan view of liner 30. Preferably, liner 30 comprises multi-layer material such as shown in FIG. 8 for a height 80. Height 80 preferably extends, from the bottom of the liner exposed to pet urine or feces in normal use, upward a substantial distance towards the top of the cover (not shown). More preferably height 80 extends more than about 50 percent of the way up the wall, and still more preferably more than 80 percent up the wall. Most preferably, it extends substantially all the way to the top of the cover. This is because a pet may typically direct its urine at a high angle or, in moving about, displace litter, feces or other contaminants upwardly. Preferably the multi-layer liner extends around substantially the entire inwardly facing area of walls of the litter box cover. If cover 12 (FIG. 1) has a door (not shown), the inner surface of the door may be provided with multi-layer liner material as shown in FIG. 8. Alternatively, liner material comprising two or more vertically hanging strips may cover an otherwise open doorway in a cover.

Figure 10:
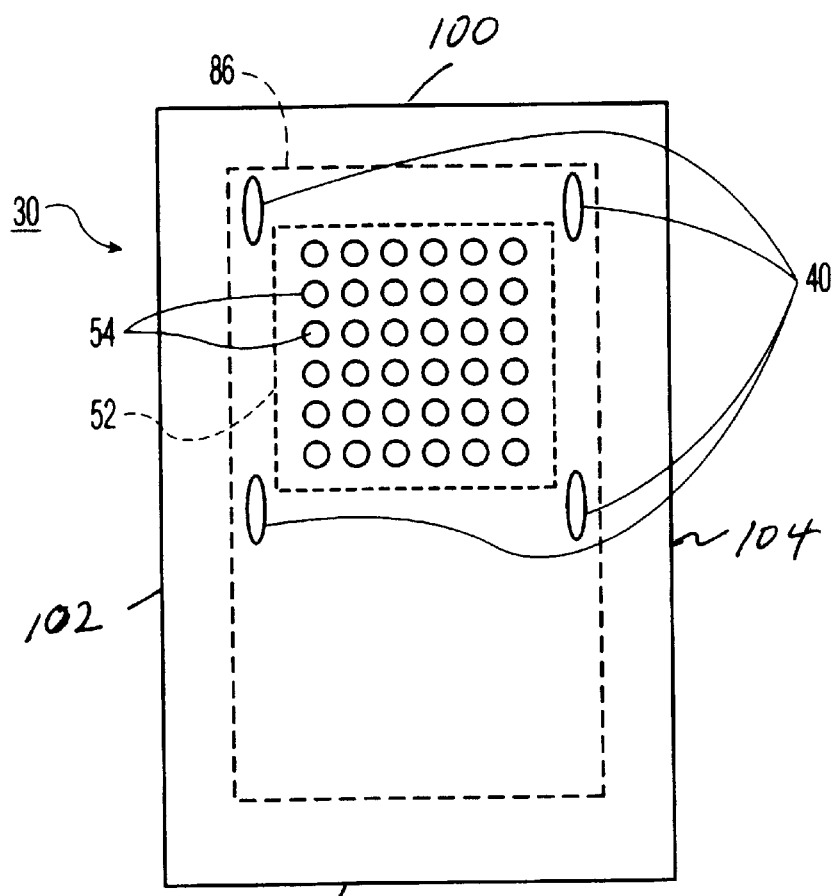
FIG. 10 is a top plan view of the liner shown in FIG. 3 simplified to omit any view of the sides of the liner.

FIG. 10 is a top plan view of the liner of FIG. 3. Because pet waste such as urine or feces, or other contaminants, may be directed upwardly in a litter box cover, the peripheral region 86 of the top of liner 30 preferably comprises at least fluid impermeable material. Peripheral region 86 preferably extends more than about 2 centimeters. Alternatively, liner 30 at the top of the cover preferably covers more than about 30 percent of the top of the cover. Or, it more preferably covers substantially the entire unvented region of the top of the cover, or, more preferably, substantially the entire top of the cover, including ventilated region 52 (but not blocking the vents). Preferably, liner 30 comprises multi-layer material such as shown in FIG. 8.

Many male of female animals tend to urinate straight backwards or to their sides at such a high velocity that the urine turns into a mist if it strikes a hard wall. The misted urine can spread over a large area of the interior of the litter box, or coat the animal itself. This problem can be drastically reduced by placing absorbent material 72 (FIG. 8), preferably covered by claw-resistant material 74 (FIG. 8), in locations most likely to receive high velocity streams of urine. Referring to FIG. 10, such locations might include a rear sidewall 100 and adjacent portions of left and right sidewalls 102 and 104, each of which may extend for height 80 (FIG. 9). The more forward portions of the sidewalls might omit the absorbent (and claw-resistant) material for economy. Front location 106 may also omit the sidewall altogether for economy.

Figure 11:
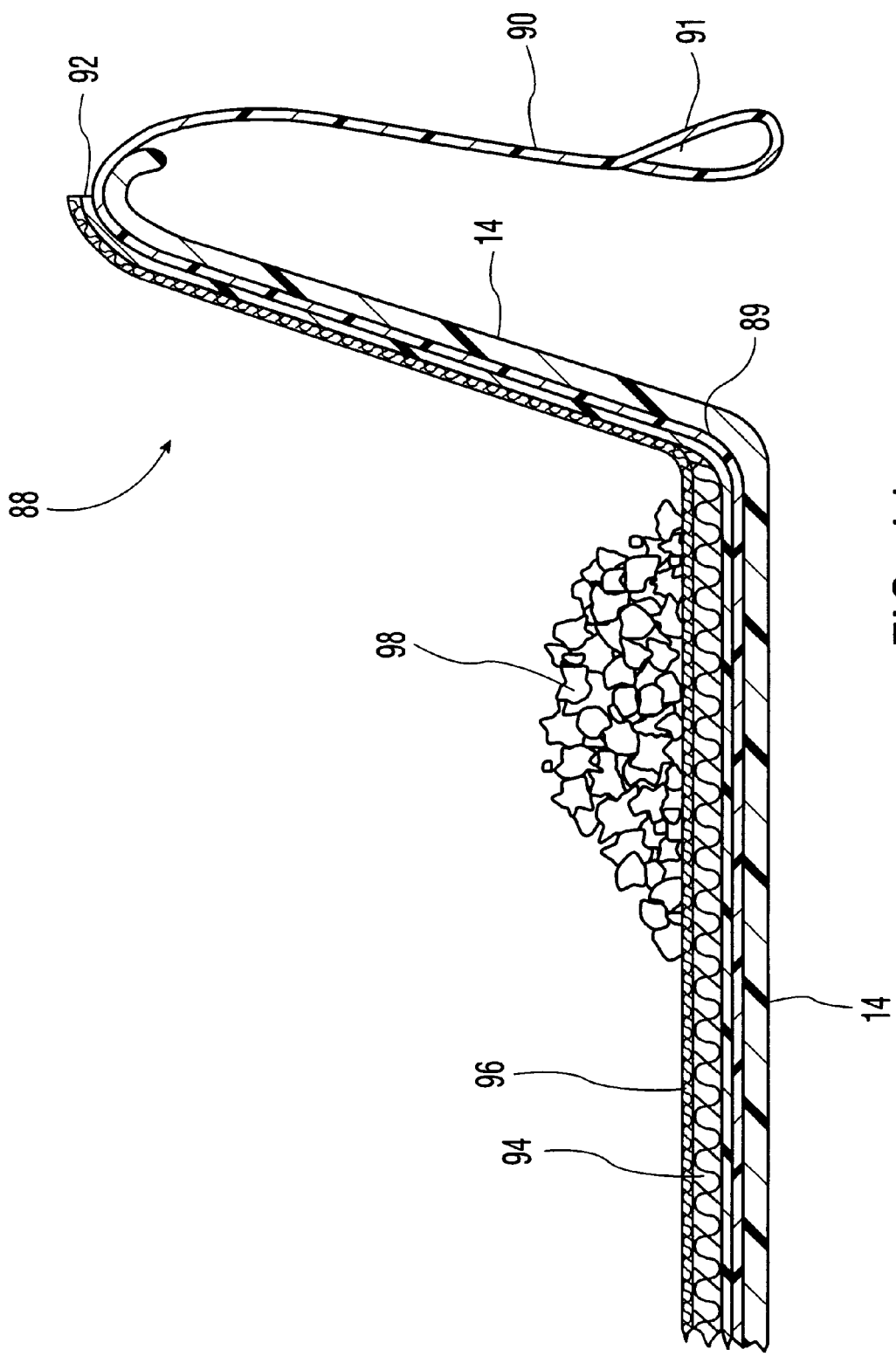
FIG. 11 shows a portion of a litter box bottom with a liner that cooperates with the liner of FIG. 3 to absorb pet urine.

FIG. 11 shows a portion of a litter box bottom 14 with a preferred form of liner 88 that cooperates with liner 30 to absorb pet urine and allow it to evaporate. A bottom portion 89 of an outer bag 90 having a drawstring region 91 preferably rests directly on the inside of box bottom 14. A fluid-impermeable layer 92 is positioned preferably directly atop bag 90. The upper, e.g., 2 to 6 centimeter peripheral portion of layer 92 is preferably attached to bag 90 by glue or heat sealing. Preferably, the sealing is substantially fully around a peripheral region of layer 92. A sorbent layer 94, which may be conventional per se, is placed above layer 92. It preferably covers at least the bottom of box bottom 14 and extends slightly upwards at the sides of the box. It preferably absorbs urine and distributes it to facilitate rapid evaporation of its moisture content. It may be overlain by a layer (not shown) of a durable, non-woven tissue substance. A fluid-permeable, claw-resistant layer 96, which may be conventional per se, is positioned above sorbent layer 94 and any tissue layer (not shown). It is affixed to layer 92 in a majority of 3-centimeter squares of areas of adjacency of the layers, preferably directly or through an intermediate layer. This results in stiffening of the affixed layers so that they tend to stay in place in the box. It may also be affixed to the sorbent layer. A preferred bonding of layer 96 to layer 92 is heat-induced bonding in thin parallel strips (e.g., under 1 millimeter) spaced apart by about one centimeter. Litter 98 may be placed atop liner 88 for collection of feces.

While the invention has been described with respect to specific embodiments by way of illustration, many modifications and changes will occur to those skilled in the art. For instance, rather than using knobs on the cover and button-holes on the liner to attach the upper liner to the cover, the following and many other types of fasteners as will be obvious to those of ordinary skill in the art may be used: snap fasteners, pressure-sensitive fasteners, hook-and-loop fasteners, track fasteners, hook fasteners, self-gripping fasteners, adhesive fasteners, toggle or switch fasteners used instead of the mentioned knobs, tongue-and-groove fasteners, track fasteners, clothes-pin type spring-loaded clip fasteners operated from in side or outside the box, dove-tail fasteners and curtain rod fasteners. Further, the cover could be manufactured with the mentioned attaching means, or retrofitted to provide such means. While the litter box described above may be typically used for a single pet, multi-litter boxes of larger dimensions may obviously require more points of attachment of the sidewall and/or top portion of the upper liner to the cover. Alternatively, the upper liner may be held in place with respect to the litter box cover by incorporating a self-supporting tent-pole type frame that rests on either the box bottom or box cover. Clips 32 (FIGS. 3–4) could incorporate any of the mentioned fasteners for attaching the upper liner to the box cover, or others as will be obvious to those of ordinary skill in the art. It is, therefore, to be understood that the appended claims are intended to cover all such modifications and changes as fall within the true scope and spirit of the invention.

What is claimed is:

1. A liner for a litter box cover designed to rest on a litter box bottom, the liner comprising:

a) a sidewall for lining a substantial portion of a sidewall of the cover otherwise exposed to pet waste during normal operation, comprising a fluid impermeable layer and an aperture for access by a pet; and b) at least one fastener for being held in position relative to the cover.

2. The liner of claim 1, wherein the liner sidewall comprises a sorbent layer positioned more toward a center of the box than the fluid impermeable layer.

3. The liner of claim 2, wherein the liner sidewall further comprises a claw-resistant layer positioned more toward the center of the box than the sorbent layer.

4. The liner of claim 1, further comprising a top attached to the liner sidewall around a substantial portion of a lateral periphery of the top; the top comprising a fluid impermeable layer.

5. The liner of claim 1, wherein the pet is a cat.

6. A liner for a litter box cover designed to rest on a litter box bottom, the liner comprising:
   a) a sidewall for lining a substantial portion of a sidewall of the cover otherwise exposed to pet waste during normal operation, the sidewall including an aperture for access by a pet and comprising, from outside to inside of the box:
      i) a fluid impermeable layer;
      ii) a sorbent layer; and
   b) a top attached to the liner sidewall around a substantial portion of a lateral periphery of the top;
   c) the liner including at least one fastener for being held in position relative to the cover.

7. The liner of claim 6, wherein the liner sidewall further comprises a claw-resistant layer positioned to protect the sorbent layer from disruption by a pet's claw.

8. The liner of claim 6, wherein the liner covers substantially an entire top of the cover.

9. The liner of claim 6, wherein the liner top comprises:
   a) a fluid impermeable layer; and
   b) a sorbent layer.

10. The liner of claim 9, wherein the liner top further comprises a claw-resistant layer positioned to protect the sorbent layer from disruption by a pet's claw.

11. A liner for a litter box cover designed to rest on a litter box bottom, the liner comprising:
    a) a sidewall for lining a substantial portion of a sidewall of the cover otherwise exposed to pet waste during normal operation, the sidewall including an aperture for access by a pet and comprising, from outside to inside:
       i) a fluid impermeable layer;
       ii) a sorbent layer; and
       iii) a claw-resistant layer; and
    b) the liner including at least one fastener for being held in position relative to the cover.

12. The liner of claim 11, wherein the liner sidewall extends vertically over more than about 50 percent of the sidewall of the cover otherwise exposed to pet waste during normal operation.

13. The liner of claim 11, wherein the liner sidewall extends vertically over more than about 80 percent of the sidewall of the cover otherwise exposed to pet waste during normal operation.

14. The liner of claim 11, wherein the liner sidewall extends vertically substantially the entire distance of the sidewall of the cover otherwise exposed to pet waste during normal operation.

15. The liner of claim 11, wherein the liner sidewall includes a top portion for covering a substantial portion of an interior of a top of the litter box cover, the top portion comprising from outside to inside:
    a) a fluid impermeable layer;
    b) a sorbent layer; and
    c) a claw-resistant layer.

16. The liner of claim 15, wherein the substantial portion of the interior of the top of the cover includes a substantial portion of an entire lateral periphery of the top.

17. The liner of claim 15, wherein the substantial portion of the interior of the top of the cover includes substantially the entire unvented region of the top.

18. The liner of claim 15, wherein the substantial portion of the interior of the top of the cover includes substantially the entire top.

19. The liner of claim 15, wherein the top portion has a region with openings for allowing access to a vent in the litter box cover.

20. The liner of claim 19, wherein the region with openings comprises a perforated region.

21. The liner of claim 11, wherein the liner further comprises:
    a) a top portion comprising fluid-impermeable material attached to the sidewall and sized to cover at least about half of an interior of the top of the cover;
    b) the top portion having a region with openings for allowing access to a vent in the litter box cover.

22. The liner of claim 11, wherein the sorbent layer is substantially uniformly distributed throughout its main surface area.

23. A liner system for a litter box of the type having a bottom and a cover that rests on the bottom, the liner system comprising:
    a) a bottom fluid impermeable liner for lining the litter box bottom from a lower surface and upwards for substantially the entire vertical height of the bottom, the bottom liner comprising from outside to inside:
       i) a fluid impermeable layer;
       ii) a sorbent layer;
       iii) a claw-resistant layer; and
    b) a top liner comprising a sidewall for lining a substantial portion of a sidewall of the cover otherwise exposed to pet waste during normal operation, the sidewall comprising, from outside to inside:
       i) a fluid impermeable layer;
       ii) an sorbent layer; and
       iii) a claw-resistant layer.

24. The liner of claim 23, wherein the sidewall extends vertically over more than about 50 percent of the sidewall of the cover otherwise exposed to pet waste during normal operation.

25. The liner of claim 23, wherein the sidewall extends vertically over more than about 80 percent of the sidewall of the cover otherwise exposed to pet waste during normal operation.

26. The liner of claim 23, wherein the sidewall extends vertically over substantially the entire sidewall of the cover otherwise exposed to pet waste during normal operation.

27. The liner of claim 23, wherein the liner includes a top portion for covering a substantial portion of an interior of the top of the litter box, the top portion comprising from outside to inside:
    a) a fluid impermeable layer;
    b) a sorbent layer; and
    c) a claw-resistant layer.

28. The liner of claim 27, wherein the top portion has a region with openings for allowing access to a vent in the litter box cover.

29. The liner of claim 27, wherein the substantial portion of the interior of the top of the cover includes a substantial portion of the lateral periphery of the top.

30. The liner of claim 27, wherein the substantial portion of the interior of the top of the cover includes substantially the entire unvented region of the top.

31. The liner of claim 27, wherein the substantial portion of the interior of the top of the cover includes substantially the entire top.

32. The liner of claim 23, wherein the liner further comprises:
   a) a top portion comprising fluid-impermeable material attached to the sidewall;
   b) the top portion having a region with openings for allowing access to a vent in the litter box cover.

33. The liner of claim 32, wherein the region with openings comprises a perforated region.

34. The liner of claim 23, wherein the sorbent layer is substantially uniformly distributed throughout its main surface area.

35. A cover for a litter box for resting on a litter box bottom and designed to be lined with a liner that is impermeable to pet urine, the cover comprising:
   a) a sidewall generally inclined vertically, extending laterally around a central area, and including an aperture for access by a pet;
   b) a top region having a lateral periphery;
   c) the cover sidewall attached to the top region along a substantial portion of the lateral periphery; and
   d) means for holding the liner relative to the cover so that the liner will stay substantially in place and will not substantially sag during normal use.

36. The cover of claim 35, wherein the means for holding includes means for attaching the liner to a lower portion and to an upper portion of the cover sidewall.

37. The cover of claim 35, wherein the means for holding includes means for attaching the liner to the top region.

38. The cover of claim 35, wherein the means for holding includes means for attaching the liner to the top region at one or more positions substantially spaced from the lateral periphery.

39. The cover of claim 35, wherein the cover sidewall is permanently attached to the top region along a substantial portion of the lateral periphery.

40. The cover of claim 35, wherein the liner includes:
   a) fluid impermeable layer;
   b) a sorbent layer between the fluid impermeable layer and the central space; and
   c) a claw-resistant layer between the sorbent layer and the central space.

41. The cover of claim 35, wherein the cover sidewall is attached to the top region along more than about 75 percent of the lateral periphery.

42. The cover of claim 35, wherein the means for holding includes knobs attached to the cover for cooperating with corresponding holes in the liner.

* * * * *